No Printed Specification Available
1346X
J. Richards,
Cutting Dye Wood.
Patented Aug. 13, 1810.
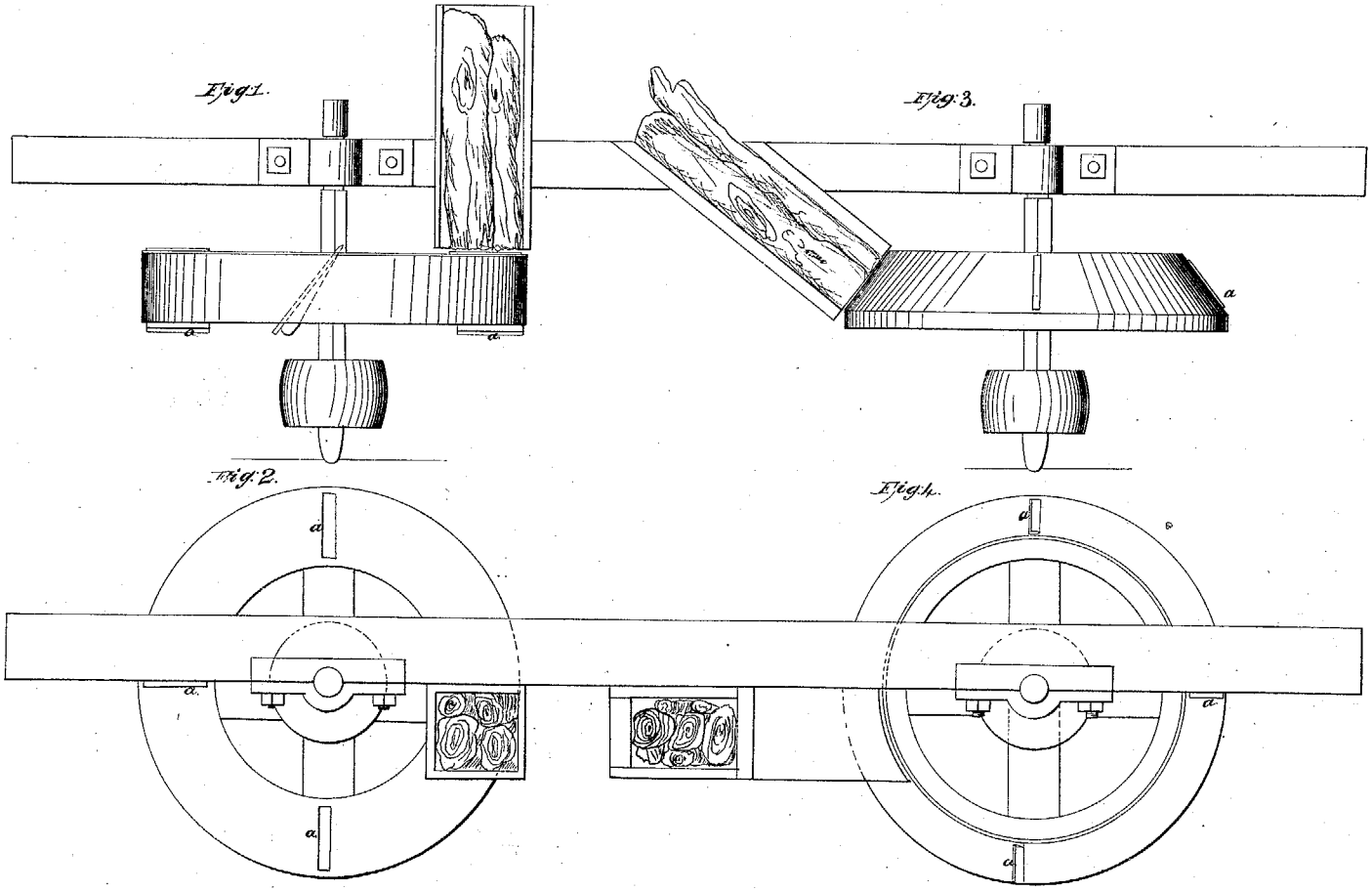
AM. PHOTO-LITHO. CO. N.Y. (OSBORNE'S PROCESS)

1346X Aug 13, 1810

Jedediah Richards 3d, Aug 13, 1810

Letters Patent

The Schedule referred to in these Letters Patent and making part of the same
containing a description in the words of the said Jedediah Richards 3d of
his machine for [illegible] dye wood.

This machine is a horizontal wheel with four
[illegible] [illegible] [illegible] [illegible] to the wheel in the form of [illegible] [illegible] standing
on a [illegible]. I have [illegible] that this wheel can be made on a large scale or
a small one to answer a good purpose. The wheel can be made of wood or iron
but for common Clothiers I have a [illegible] of iron on a wooden [illegible], and
where the business is carried on in a large scale then the wheel may be made
of iron. The [illegible] or guard is to be made with an [illegible] of timber one end
[illegible] to something solid that will stand the force of the wheel and not
[illegible] [illegible] above the wheel and lying so close to the wheel that the friction
may be easy, with a plate of iron on [illegible] end or side to prevent the wear.
The wheel I find may run perpendicular or horizontal having the [illegible]
on the edge or side. but I prefer a horizontal wheel having the [illegible]
on the side or [illegible]. The method of holding the dye stuff, for com
mon Clothiers is calculated to be held by hand but where the business
is carried on upon a large scale I have a [illegible] or [illegible] that
holds the Dye Woods on a [illegible] [illegible] perpendicular as may best and
[illegible] [illegible]

Witnesses Isaiah Clark } Jedediah Richards 3d.
Mills Richards
Augustus [illegible]

Exd.
1836

Drawing made by [illegible] 1841.